United States Patent

Bollinger et al.

[15] 3,636,586
[45] Jan. 25, 1972

[54] CASTER AND SWIVEL LOCK ASSEMBLY

[72] Inventors: Howard N. Bollinger; Leslie R. Inglis, both of Cincinnati, Ohio

[73] Assignee: American Hospital Supply Corporation, Evanston, Ill.

[22] Filed: Dec. 11, 1969

[21] Appl. No.: 884,182

[52] U.S. Cl. ................................ 16/35, 188/1, 280/79.1
[51] Int. Cl. ........................................................ B60b 33/00
[58] Field of Search ............... 16/35, 35 D; 188/1 D; 280/80, 280/79.1, 78

[56] References Cited

UNITED STATES PATENTS 3,070,828   1/1963   Clinton et al. ..................... 16/35

Primary Examiner—Bobby R. Gay
Assistant Examiner—Doris L. Troutman
Attorney—Dawson, Tilton, Fallon & Lungmus

[57] ABSTRACT

A self-aligning swivel caster for use on carts and the like, the caster being equipped with a releasable locking member capable of selectively locking the caster against swivel movement. The locking member is gravity actuated and may be latched in an inoperative position as desired. The structural relationship of the caster and locking member are such that automatic camming and subsequent actuation of the locking member occur as the caster wheel is swiveled from an unlocked position into a position in which it is capable of being locked.

6 Claims, 9 Drawing Figures

PATENTED JAN 25 1972

*INVENTORS*
HOWARD N. BOLLINGER
LESLIE R. INGLIS

BY: Dawson, Tilton, Fallon & Lungmus

ATT'YS

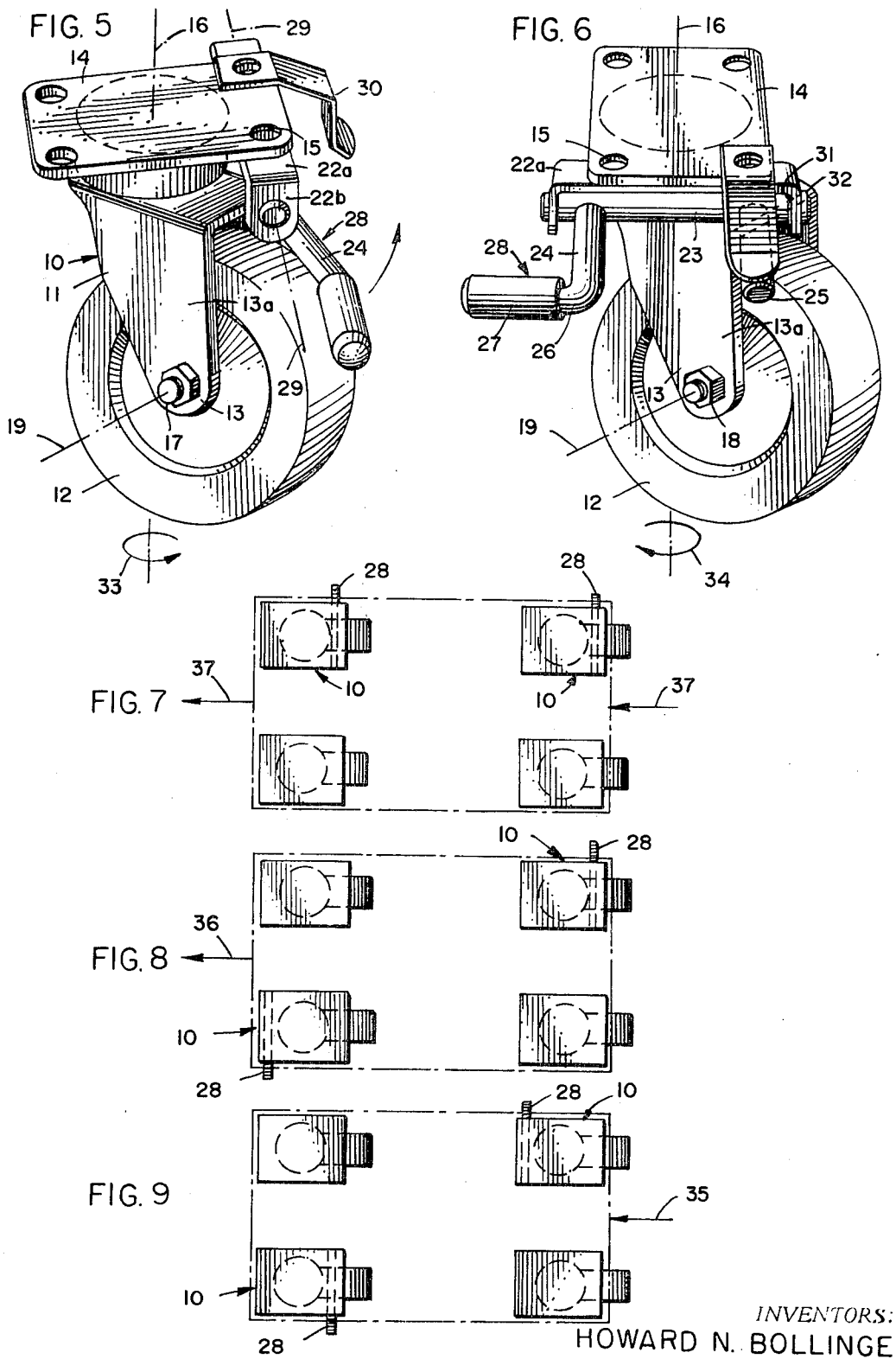

3,636,586

CASTER AND SWIVEL LOCK ASSEMBLY

BACKGROUND

As is well known, caster wheels are commonly provided on carts and other movable equipment and, in most instances, the casters at least at one end of such equipment are capable of swiveling so as to make that end, and the equipment as a whole, more maneuverable. It is apparent, however, that if all wheels of a cart or other equipment are free to swivel, then the difficulties in maintaining directional control may actually reduce the unit's maneuverability Such a cart may tend to drift laterally as it is pushed or pulled. While such problems may be overcome by using nonswiveling casters at the front of a pushcart, or at the rear of a pull cart, such an arrangement usually results in a cart which can be easily maneuvered only if it is pushed or pulled from the end equipped with the swivel casters. In many instances, especially where the equipment is relatively large and heavy, or where maneuvering time must be reduced as much as possible (as where such casters are sued on stretchers or other emergency hospital equipment), the limitations on maneuverability resulting from the provision of swivel casters at only one end may present as much of a problem as the lack of directional stability should swivel casters be provided at both ends.

SUMMARY

A caster and swivel lock assembly provided, the lock permitting the caster to be secured against swivel movement with the caster wheel in a longitudinally aligned position. The locking member comprises a shaft with a transverse horizontal axis spaced above the caster wheel and behind the caster's vertical swivel axis. The shaft is pivotally supported by a bracket adapted to be fixed to the cart or other equipment, and has a pair of spaced parallel fingers which normally straddle the fork of the caster wheel and lock it against swivel action. A handle, which may be a lateral extension of one of the fingers, is used to swing the locking member into an inoperative position with the fingers raised above the caster wheel, thereby permitting free swivel action of the wheel.

The caster is of the self-aligning type with the axis of the wheel spaced behind the vertical swivel axis, The pivot axis of the locking member is behind but in close proximity to the swivel axis; in a preferred embodiment, the axis of the locking member is directly or almost directly above the axis of the wheel when the wheel is in its normal trailing position. Consequently, swivel action of the wheel from a nontrailing position into its normal trailing position while the locking member is lowered results in engagement between one of the locking fingers and the wheel or its fork, and continued swivel action of the wheel towards its normal trailing position automatically cams the locking member into a raised position. Finally, when the wheel has fully swiveled into its trailing position, the locking member is free to pivot downwardly under the influence of gravity to lock the wheel against further swivel action.

For those applications which require it, the caster is equipped with a spring latching member for holding the locking member in its inoperative position. Release of the locking member from its latched position, or movement of it from an operative to an inoperative position, may be easily and quickly accomplished by simply engaging and lifting the locking member with the toe.

DRAWINGS

FIGS. 5 and 6 are perspective views illustrating the camming action of the caster wheel upon the locking member as the caster wheel swivels in one direction or the other towards a normal trailing position;

FIG. 7 is a somewhat schematic top plan view of a cart equipped with a caster arrangement suitable for either pulling action or pushing action of the cart in one direction;

FIG. 8 is a schematic view similar to FIG. 7 but showing a different caster arrangement for a pull cart which may be pulled from either end;

FIG. 9 is a schematic view similar to FIGS. 7 and 8 but showing a caster arrangement suitable for a push cart which may be pushed from either end.

DESCRIPTION

Figure 1:
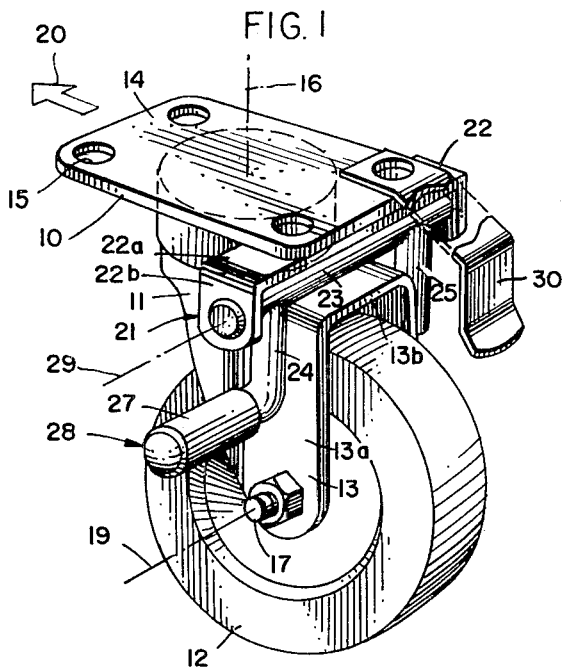
FIG. 1 is a perspective view illustrating a caster of the present invention with its locking member in operative position, the latching spring being broken partly away to illustrate more clearly the structural features of the unit.

In the embodiment of the invention illustrated in the drawings, the numeral 10 generally designates the complete caster and swivel lock combination. In that combination, the caster assembly 11 is conventional and consists of a caster wheel 12, a fork 13, and a mounting plate 14. The horizontal mounting plate is provided with a plurality of openings 15 for bolting or otherwise securing the plate to the underside of a cart or the like. The fork is pivotally connected to the mounting plate for rotation about a generally vertical swivel axis 16, and the axle 17 of the caster wheel is secured to the lower ends of the fork by nuts 18 or other appropriate attachment means. The caster is of the self-aligning type; that is, the horizontal axis 19 of wheel 12 is spaced behind swivel axis 16 so that as the caster is moved in the direction of arrow 20 the caster will automatically swivel into the trailing position illustrated in FIG. 1. Since the caster assembly is conventional and its components and construction are well known, further description of its structure and operation, except to the extend that they bear directly on the cooperative relationship between the caster assembly and the swivel lock assembly, is believed unnecessary herein.

Figure 2:
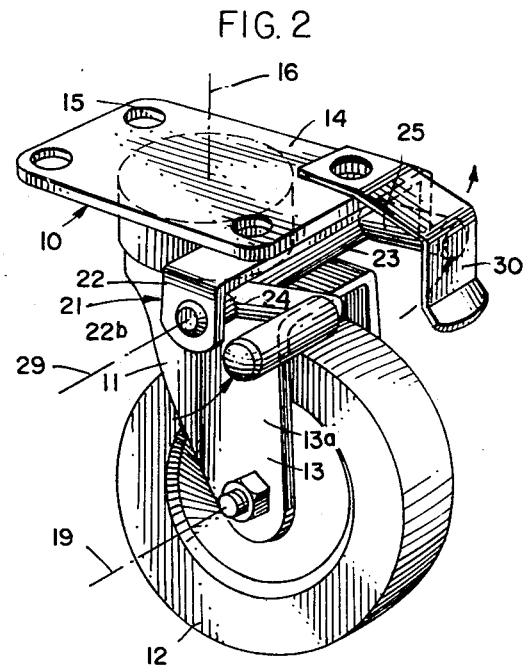
FIG. 2 is a perspective view similar to FIG. 1 but showing the locking member in its raised or inoperative position.
Figure 4:
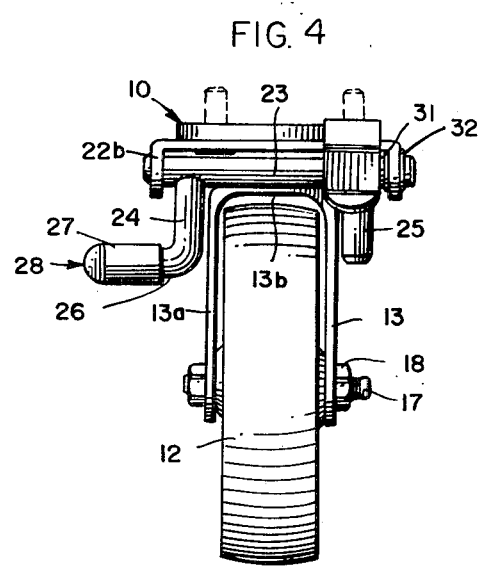
FIG. 4 is an end elevational view.

As shown most clearly in FIGS. 1, 2, and 4, the fork 13 of the caster is of inverted U-shaped configuration, having substantially straight depending side portions 13a and a generally horizontal connecting portion 13b. The connecting portion is spaced beneath mounting plate 14 and is preferably formed integrally with the depending side portions 13a.

The swivel lock assembly is generally designated by the numeral 21 and includes a bracket 22 of inverted U-shaped configuration having a transversely extending intermediate portion 22a which is fixed to mounting plate 14 and a pair of depending side portions 22b which are spaced apart a distance considerably greater than the width of fork 13. The depending side portions of the bracket are apertured and rotatably receive the ends of a horizontal shaft 23. A pair of spaced finger elements 24 and 25 extend radially from shaft 23 a distance less than the radius of wheel 12. As shown in the drawings, the finger elements 24 and 25 are substantially parallel and are spaced apart a distance slightly greater than the width of fork 13. At its lower end, one of the finger elements 24 is turned outwardly or laterally to define a handle portion 26 which may if desired by provided with a resilient covering 27 formed of rubber or other suitable material.

Figure 3:
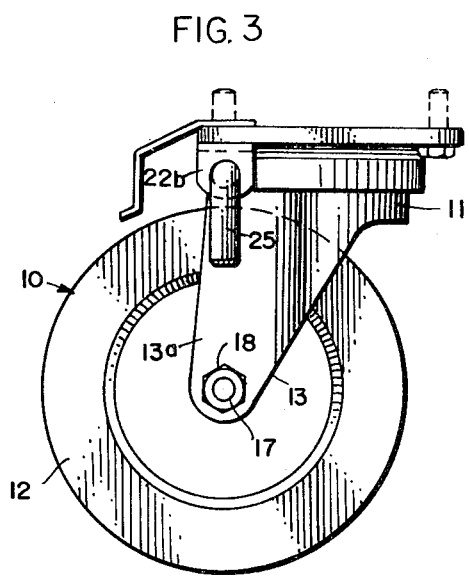
FIG. 3 is a side elevational view of the caster.

Shaft 23 and finger elements 24 and 25 together constitute a locking member 28 for locking the caster against swivel action. It will be observed that the pivot axis 29 of the locking member—that is, the axis of shaft 23—is disposed substantially directly above the axis 19 of wheel 12 when the caster is in its trailing position illustrated in FIGS. 1, 2, and 3. FIG. 1 illustrates the locking member in its operative position with locking fingers 24 and 25 straddling the fork and locking it against movement about swivel axis 16. It will be observed that the fingers engage only the side portion of the fork and do not engage the wheel itself; therefore, damage to the wheel which might otherwise be caused during full-speed operation of the cart is completely avoided.

FIG. 2 illustrates the locking member in its raised or inoperative position. In that position, the locking fingers 24 and 25 extend rearwardly or outwardly above wheel 12 and fork 13, free of engagement therewith. Retaining or latching means in the form of a retention spring 30 serves to frictionally maintain the locking member in its raised inoperative position. As shown, one end of the spring is fixed to mounting plate 14 and the other end portion of the spring extends rearwardly and then downwardly to engage the end of locking finger 25 when the locking member is raised. The latching force of the spring may be overcome whenever desired by simply urging handle portion 26 downwardly, thereby releasing the locking member and permitting it to drop downwardly under the influence of gravity into the locking position shown in FIG. 1.

It is to be understood that the mounting plate 14, mounting bracket 22, and latching spring 30 may be secured together by welding or by any other suitable means. If desired, the parts may be fixed together by the same bolts or attachment means used to affix the mounting plate 14 to the bottom of the cart or other equipment. The shaft 23 is retained against axial sliding movement in bracket 22 by means of C-rings 31 and 32 as shown in FIGS. 4 and 6.

An important aspect of the invention lies in the fact that the locking member may be released when the wheel is in a nontrailing position and will thereafter automatically lock the caster against swivel action when the wheel swings into its trailing position. Thus, referring to FIG. 5 caster 11 is illustrated as it is pivoting about swivel axis 16 in the counterclockwise direction (viewed from above) represented by arrow 33. As it swivels, the wheel engages finger element 24 of the locking member to pivot that member upwardly about the axis 29 of shaft 23. The wheel therefore cams the locking member into a partially raised position and retains it in that position until the wheel has swiveled into its normal trailing position, at which time the locking member will pivot downwardly into the locking position of FIG. 1 to secure the caster against further swivel action until the locking member is intentionally raised.

Similarly, if the caster wheel swivels in the opposite direction about axis 16, in the direction of arrow 34 as illustrated in FIG. 6, the wheel and fork will engage locking finger 25 to pivot the locking member into a partially raised position until the caster has reached its trailing position and the locking member is free to drop downwardly under the influence of gravity into its full-locking position.

The automatic camming and locking action of the swivel lock may be utilized by arranging the casters in various ways depending on the manner in which a particular cart is intended to be used. For example, FIG. 9 schematically illustrates a cart which is designed to be pushed rather than pulled, but one which may be pushed from either end and which is therefore reversible. In that case, a pair of swivel casters 10 equipped with locking members 28 are mounted at opposite ends of the cart with the locking members in inboard positions as shown in FIG. 9. Assuming that the locking members of both casters are in their lowered positions and that the cart is being pushed in the direction of arrow 35, it will be observed that the locking member of only the front caster is operative to prevent swivel action. No locking action is performed by the locking member of the rear caster because that locking member is not disposed above the trailing caster wheel. Therefore, the rear end of the cart may be easily shifted from side to side and the cart may be readily maneuvered. However, if the user should desire to reverse the direction of the cart, pushing it in the direction opposite from the direction represented by arrow 35, then he need simply lift the locking member at the rear end of the cart (the left end as viewed in FIG. 9). As the cart moves forwardly (to the right), the self-aligning casters at the front (right end of the cart will swivel about and one of such casters will automatically be locked against swivel movement as it swings into its trailing position. Therefore, the self-locking action of the locking members will be effective to automatically lock the front end of the cart against lateral movement regardless of the direction in which the cart is pushed.

FIG. 8 illustrates a caster arrangement in which the self-locking feature is utilized in a cart intended to be pulled from either end; that is, a reversible pull cart. In such case, the casters are arranged with locking members 28 disposed outboard with respect to the cart. As the cart is being pulled in the direction of arrow 36, only the locking member of a rear caster is operative and therefore only the rear end of the cart is restrained against lateral movement. Should the direction of the cart be reversed, the operator simply releases the locking member at the end which is to become the front of the pull cart (the right end as shown in FIG. 8) and then, as the cart is moved in a direction opposite from the direction represented by arrow 36, the casters will swivel and the locking member 28 at the rear (left) end will automatically be cammed into operative position.

Since lateral movement at the end of a cart may be prevented by the action of only a single-swivel lock at that end, only one swivel lock is provided at each end of the carts illustrated in FIGS. 8 and 9. The other casters would be identical except that the swivel locks 21 would be omitted from those casters.

FIG. 7 illustrates a still further possible arrangement of lockable swivel casters. The cart illustrated in FIG. 7 is intended to be either pushed or pulled, but in only one direction. In other words, the push-pull cart of FIG. 7 is generally nonreversible. In that event, the lockable swivel caster at the front (left) end of the cart would be mounted with its locking member 28 in an inboard position and the lockable caster at the rear (right) end of the cart would be mounted with its locking member in an outboard position. Movement of the cart would always be in the general direction of arrows 37; however, if the cart were to be pulled, then the locking member 28 of the front caster would be latched in raised inoperative position, whereas if the cart were to be pushed the locking member of the rear caster would be latched in its raised inoperative position.

In general, the end of the cart to which the moving force (either pushing or pulling) is to be applied should have a locking member on the leading side of the caster at the end, thereby leaving such end free for lateral maneuvering. The end of the cart opposite from the end to which the moving force is applied should have a locking member on the trailing side of the caster, thereby locking such end against lateral movement.

While in the foregoing an embodiment of the invention has been disclosed in considerable detail for purposes of illustration, it will be understood by those skilled in the art that many of these details may be varied without departing from the spirit and scope of the invention.

We claim:

1. A swivel caster assembly including a mounting member, a fork connected to said mounting member for swivel action about a generally vertical swivel axis, and a wheel supported by said fork for rotation about a horizontal axis of rotation, said axis of rotation being spaced behind said swivel axis when said wheel is in a normal trailing position, the improvement wherein a locking member is pivotally mounted and positioned for releasably locking said wheel in said trailing position, said locking member comprising a transverse horizontal shaft and a pair of parallel finger elements projecting radially therefrom, means fixed relative to said mounting member and supporting said shaft for pivotal movement between a locking position wherein said fingers are lowered and a releasing position wherein said fingers are raised, said shaft having its axis disposed behind said swivel axis, said finger elements being spaced apart a distance greater than the width of said fork and straddling said fork to prevent movement of the same about said swivel axis when said locking member is in its locking position, said finger elements being disposed above said wheel and said fork to permit movement of said fork about said swivel axis when said locking member is in its releasing position, said finger elements being dimensioned and proportioned for engagement with said fork as said wheel is swiveled into its trailing position to cam said fingers from lowered to partially raised positions, said locking member thereafter pivoting under the influence of gravity into its locking position when said caster wheel reaches its trailing position.

2. The structure of claim 1 in which means are provided for releasably holding said locking member in said releasing position.

3. The structure of claim 2 in which said means for releasably holding said locking member in said releasing position comprises a spring member frictionally engageable with one of said finger elements when said elements are raised.

4. The structure of claim 1 in which said axis of said shaft is disposed in close proximity to said swivel axis.

5. The structure of claim 4 in which said axis of said shaft is disposed substantially directly above said rotational axis of said wheel when said wheel is in its trailing position.

6. The structure of claim 1 in which one of said finger elements is provided at the free end thereof with a laterally projecting handle portion.

* * * * *